United States Patent [19]
Ziggiotti et al.

[11] 3,852,270
[45] Dec. 3, 1974

[54] PROCESS FOR THE PREPARATION OF 7-CHLORO-5-PHENYL-3H-1,4-BENZODIAZPINE-2-(1H)ONE

[75] Inventors: Antonio Ziggiotti, Vezia Ticino, Switzerland; Giovanna Riva, Milan; Francesco Mauri, Sesto San Giovanni, both of Italy

[73] Assignee: Ravizza S.A., Lausanne, Switzerland

[22] Filed: Mar. 1, 1972

[21] Appl. No.: 230,993

[30] Foreign Application Priority Data
Mar. 5, 1971 Great Britain .................. 6138/71

[52] U.S. Cl. ................... 260/239.3 D, 260/999
[51] Int. Cl. ............................. C07d 53/06
[58] Field of Search ............. 260/239.3 D, 570 AB

[56] References Cited
UNITED STATES PATENTS
3,371,085   2/1968   Reeder et al. ............. 260/239.3 D
3,635,948   1/1972   Nino et al. ................. 260/239.3 D Primary Examiner—Henry R. Jiles
Assistant Examiner—Robert T. Bond
Attorney, Agent, or Firm—Richard K. Stevens

[57] ABSTRACT

Process for the preparation of 7-chloro-5-phenyl-3H-1,4-benzodiazepine-2(1H)one characterized in that:
a. 2-chloroacetamido benzophenone is cyclized with ammonia in the presence of dimethylsulphoxide, at a temperature of 50°–100° C and
b. the thus obtained 1,3-dihydro-5-phenyl-2H-1,4-benzodiazepine-2-one is selectively chlorinated in the 7-position with chlorine in the presence of nitro-benzene as the solvent.

1 Claim, No Drawings

PROCESS FOR THE PREPARATION OF 7-CHLORO-5-PHENYL-3H-1,4-BENZODIAZPINE-2-(1H)ONE

This invention relates to a process for the preparation of the 7-chloro-benzodiazepine derivative 7-chloro-5-phenyl-3H-1,4-benzodiazepine-2-(1H)-one, and to therapeutic compositions containing such a derivative in admixture with a physiologically acceptable diluent or carrier.

This derivative although described in the art for many years, has never been used in the field of psycodrugs even though a number of other benzodiazepines have been successfully used in this field. We have now found that 7-chloro-5-phenyl-3H-1,4-benzodiazepine-2-(1H)-one is a highly interesting psycodrug with which unexpected clinical results have been obtained, superior in many respects to those that have been obtained with other benzodiazepines, presently on the market.

Although a number of preparative methods have been proposed for compounds having a general formula including the above derivative, none of them has been actually carried out to produce this derivative on an industrial scale.

In particular there has been proposed a method for preparing 7-chloro-5-phenyl-3H-1,4-benzodiazepine-2-(1H)-one starting from 5-chloro-2-amino-benzophenone. By reaction of this compound with bromoacetyl bromide, 2-bromoacetamido-5-chloro-benzophenone is obtained which in turn by cyclization with for example methanolic ammonia leads to 7-chloro-5-phenyl-3H-1,4-benzodiazepine-2-(1H)-one with yields of about 33 percent. The same reaction repeated with chloroacetyl chloride, and thus through cyclization of 2-chloroacetamido-benzophenone, takes place with yields of about 10 percent to 15 percent.

Because of the low yields of this method it is not suitable for use on a commercial scale.

This invention provides a process for preparing 7-chloro-5-phenyl-3H-1,4-benzodiazepine-2-(1H)-one, which comprises the following successive steps:

a. cyclizing 2-chloroacetamido benzophenone to 1,3-dihydro-5-phenyl-2H-1,4-benzodiazepine-2-one with ammonia in the presence of dimethyl sulphoxide at a temperature of 50° to 100° C. The reaction takes place with yields ranging from 60 percent to 70 percent.

b. reacting a solution of the 1,3-dihydro-5-phenyl-2H-1,4-benzodiazepine-2-one in nitro-benzene with chlorine.

The process of step (b) is the subject of our copending Pat. application Ser. No. 230,994, filed Mar. 1, 1972. Under the conditions of step (b) a chlorine atom is selectively introduced in the 7-position and 7-chloro-5-phenyl-3H-1,4-benzodiazepine-2-(1H)-one is produced with very high yields.

This invention is illustrated by the following Example.

EXAMPLE 40 ml of dimethylsulphoxide were saturated with gaseous ammonia at 100°C and then admixed with 8.9 g of 2-chloro-acetamido-benzophenone also dissolved in 30 ml of dimethyl-sulphoxide, and gaseous ammonia was bubbled through the mixture. The reaction mixture was then heated without stirring for 30 minutes and concentrated to a syrup under vacuum. The syrup was taken up with 70 ml of diethyl ether and 50 ml of water whilst stirring, the solution was neutralized with sodium bicarbonate and 80 ml of petroleum ether was added thereto. The precipitated product was separated and recrystallized from 80 percent ethyl alcohol. 4.9 g of 1,3-dihydro-5-phenyl-2H-1,4-benzodiazepine-2-one were obtained, with a melting point 178°–180° C. The yield was 63 percent.

10 g of 1,3-dihydro-5-phenyl-2H-1,4-benzodiazepine-2-one were suspended in 70 ml of nitrobenzene and 3.2 g of chlorine and 0.5 g anhydrous $FeCl_3$ were added thereto.

The mixture was stirred in the dark for 48 hours. 70 ml of diethyl ether were then added, stirring was maintained for a further 30 minutes and the resulting precipitate was filtered.

The product thus separated was suspended in 100 ml of water and 100 ml of diethyl ether and neutralized with sodium bicarbonate whilst stirring. After crystallization from 70 percent ethyl alcohol 5.5 g of 7-chloro-5-phenyl-3H-1,4-benzodiazepine-2-(1H)-one were obtained, M.P. 215° C. All the unconverted starting material was recovered from the mother liquors, so that the effective net yield was 100 percent.

We claim:

1. Process for the preparation of 7-chloro-5-phenyl-3H-1,4-benzodiazepine-2(1H)one characterized in that:

a. 2-chloroacetamido benzophenone is cyclized with ammonia in the presence of dimethylsulphoxide, at a temperature of 50–100° C. and
   b. the thus obtained 1,3-dihydro-5-phenyl-2H-1,4-benzodiazepine-2-one is selectively chlorinated in the 7-position with chlorine in the presence of nitro-benzene as the solvent.

\* \* \* \* \*